(12) United States Patent
Marcus et al.

(10) Patent No.: US 6,522,410 B1
(45) Date of Patent: Feb. 18, 2003

(54) METHOD FOR PROCESSING LOW COHERENCE INTERFEROMETRIC DATA

(75) Inventors: Michael A. Marcus, Honeoye Falls, NY (US); Jiann-Rong Lee, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/521,089

(22) Filed: Mar. 7, 2000

(51) Int. Cl.[7] .................................................. G01B 9/02
(52) U.S. Cl. ........................ 356/497; 356/503; 250/550
(58) Field of Search .......................... 250/550; 356/479, 356/497, 503

(56) References Cited

U.S. PATENT DOCUMENTS

| | | |
|---|---|---|
| 5,341,205 A | 8/1994 | McLandrich et al. |
| 5,596,409 A | 1/1997 | Marcus et al. |
| 5,659,392 A | 8/1997 | Marcus et al. |
| 5,757,485 A | 5/1998 | Marcus et al. |
| 5,757,486 A | 5/1998 | Marcus et al. |
| 6,034,772 A | * 3/2000 | Marcus et al. ............... 356/503 |
| 6,038,027 A | * 3/2000 | Marcus et al. ............... 356/503 |

FOREIGN PATENT DOCUMENTS

| | | |
|---|---|---|
| EP | 0 762 078 A2 | 3/1997 |
| EP | 0 997 826 A2 | 5/2000 |
| JP | 2000028521 | 1/2000 |

* cited by examiner

Primary Examiner—Samuel A. Turner
Assistant Examiner—Patrick Connolly
(74) Attorney, Agent, or Firm—Thomas H. Close

(57) ABSTRACT

A method of processing interferometric data relating to a sample having multiple reflective surfaces, includes the steps of: specifying a set of acceptance ranges for peaks of interest in the interferogram, based on a knowledge of the sample; determining which peaks in the interferogram fall within the acceptance ranges; identifying which peaks within the acceptance ranges represent multiple reflections and eliminating these peaks from the interferometric data; identifying acceptance ranges which do not contain peaks; and employing other peaks in the interferogram to calculate the locations of peaks in the acceptance ranges that do not contain peaks.

26 Claims, 16 Drawing Sheets

| PEAK # | PEAK LOCATION | PEAK AMPLITUDE | NEAREST ZERO-CROSSING DISTANCE | ADJACENT ZERO-CROSSING/FARTHEST PEAKS DISTANCES | SCAN DIRECTION REVERSAL LOCATIONS | SCAN AMPLITUDE |
|---|---|---|---|---|---|---|
| 1b | 78.81 | 1695 | 0 | | 244.26 | |
| 2b | 409.7 | 1570 | 0 | 330.89 | | |
| 3b | 1412.36 | 258 | 1002.66 | | | |
| 4b | 1626.59 | 198 | 1216.89 | | | 2958.84 |
| 5b | 2629.13 | 428 | 2219.43 | | | |
| 6b | 2765.38 | 123 | 2355.68 | | 3203.10 | |
| 7b | 3640.81 | 113 | 2355.67 | 875.43 | | |
| 8b | 3777.13 | 432 | 2219.35 | | | |
| 9b | 4779.59 | 195 | 1216.89 | | | 2957.28 |
| 10b | 4993.83 | 260 | 1002.65 | | | |
| 11b | 5996.48 | 1576 | 0 | | 6160.38 | |
| 12b | 6324.27 | 1690 | 0 | 327.79 | | |

*FIG. 13*

| PEAK # | PEAK LOCATION | PEAK AMPLITUDE | ZERO-CROSSING DISTANCE | PEAK DEFINITION |
|---|---|---|---|---|
| 1a | 148.120 | 823 | 0 | 0-CROSSING |
| 2a | 451.855 | 27 | 303.735 | PG − GS − nt |
| 3a | 1153.151 | 52 | 1005.031 | GS |
| 4a | 1360.139 | 190 | 1212.020 | nt |
| 5a | 1455.341 | 41 | 1307.221 | PG − nt |
| 6a | 1662.551 | 25 | 1514.431 | PG − GS |
| 7a | 2365.171 | 97 | 2217.051 | GS + nt |
| 8a | 2572.159 | 17 | 2424.039 | 2nt |
| 9a | 2668.057 | 63 | 2519.937 | PG |

*FIG. 15*

METHOD FOR PROCESSING LOW COHERENCE INTERFEROMETRIC DATA

FIELD OF THE INVENTION

The present invention relates generally to optical interferometry, and more particularly to a method of processing interferometric data from an object having multiple optical interfaces.

BACKGROUND OF THE INVENTION

Optical interferometry has been used to measure physical properties of an object. For example, commonly assigned U.S. Pat. No. 5,659,392, issued Aug. 19, 1997 to Marcus et al., entitled "Associated Dual Interferometric Measurement Apparatus for Determining a Physical Property of an Object," and U.S. Pat. No. 5,596,409, issued Jan. 21, 1997 to Marcus et al., entitled "Associated Dual Interferometric Measurement Method for Determining a Physical Property of an Object," relate to an associated dual interferometric apparatus and method for measuring physical properties of an object, such as thickness, group index of refraction, and distance to a surface. U.S. Pat. No. 5,757,485, issued May 26, 1998 to Marcus et al., entitled "Digital Camera Image Sensor Positioning Method Including a Non-Coherent Interferometer," and U.S. Pat. No. 5,757,486, issued May 26, 1998 to Marcus et al., entitled "Digital Camera Image Sensor Positioning Apparatus Including a Non-Coherent Light Interferometer," disclose a non-coherent light interferometer in communication with an optical probe apparatus for determining a position of an image sensor within a digital camera relative to a reference surface.

While the methods disclosed by these references have achieved certain degrees of success in their particular applications, a need continues to exist for an automated method for processing interferometric data, particularly when additional, superfluous interferometric data is obtained. More particularly, when processing interferometric data, automated methods are needed to make a determination regarding which interferometric data is relevant and which data is superfluous. A need also continues to exist for an automated method for processing interferometric data when some interferometric data is missing or hidden in the measurement noise. Further, when the interferometric data corresponds with a multi-component physical entity, such as reflections from a plurality of optical interfaces, reflections between the various interfaces may result in extra peaks in the interferogram. As an example, a double reflection from a pair of adjacent interfaces would cause an extra peak to occur at twice the actual optical thickness of the layer defined by the adjacent interfaces. To properly analyze the data, these extra peaks need to be removed from the data. This process is time consuming and tedious. There is a need therefore for a rapid automated method for removing extra peaks from interferograms prior to analysis.

SUMMARY OF THE INVENTION

The above noted need is met according to the present invention by providing a method of processing interferometric data relating to a sample having multiple reflective surfaces, that includes the steps of: specifying acceptance ranges for peaks of interest in the interferogram, based on a knowledge of the sample; determining which peaks in the interferogram fall within the acceptance ranges; identifying which peaks within the acceptance ranges represent multiple reflections and eliminating these peaks from the interferometric data; identifying acceptance ranges which do not contain peaks; and employing other peaks in the interferogram to calculate the locations of peaks in the acceptance ranges that do not contain peaks.

The present invention provides an automated method for processing interferometric data, particularly when superfluous interferometric data is obtained. The present invention further provides for the processing of interferometric data when some interferometric data is missing or hidden in the measurement noise. The method provides for a correspondence between the interferometric data and a physical entity to which the data corresponds.

BRIEF DESCRIPTION OF THE DRAWINGS

FIG. 13 shows tabular data corresponding to the interferogram of FIG. 12;

FIG. 15 shows tabular data corresponding to the interferogram of FIG. 1.

DETAILED DESCRIPTION OF THE INVENTION

Figure 1:
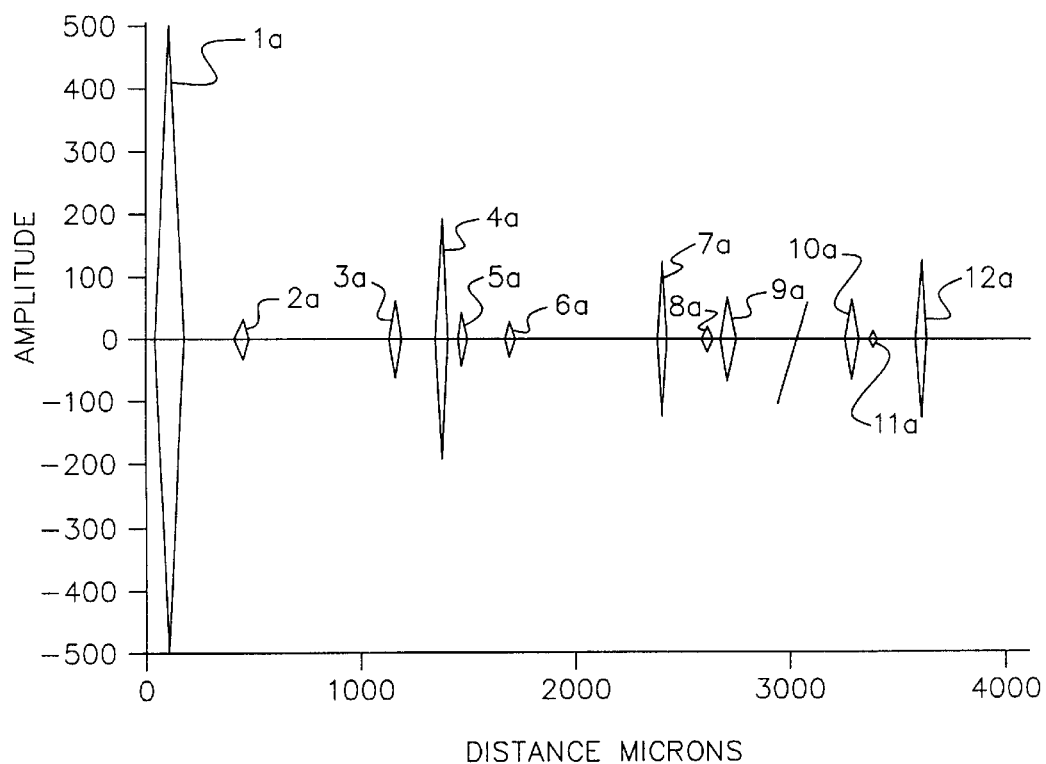
FIG. 1 is an interferogram, including a plurality of peaks of the type produced by the method and apparatus described in U.S. Pat. No. 5,659,392.

The following is a detailed description of the preferred embodiments of the invention, reference being made to the drawings in which the same reference numerals identify the same elements of structure in each of the several figures.

Referring to FIG. 1, an interferogram, including a plurality of peaks $1a-12a$ of the type produced by the method and apparatus described in U.S. Pat. No. 5,659,392, is shown. These peaks represent the relative locations of reflective surfaces in a sample containing multiple reflective surfaces.

Included in the observed interferogram are peaks representative of sums of distances between surfaces, multiples of distances between surfaces, and differences of distances between surfaces. It is also possible that peaks of interest are missing from the interferometric data and/or extra peaks representing noise are present. The problem solved by the present invention is to automatically identify the peaks of interest in the interferogram, including the locations of missing peaks. The method of the present invention is based on using a priori knowledge of the relative locations of the reflective surfaces in the sample to identify the true locations of the peaks of interest.

Figure 2:
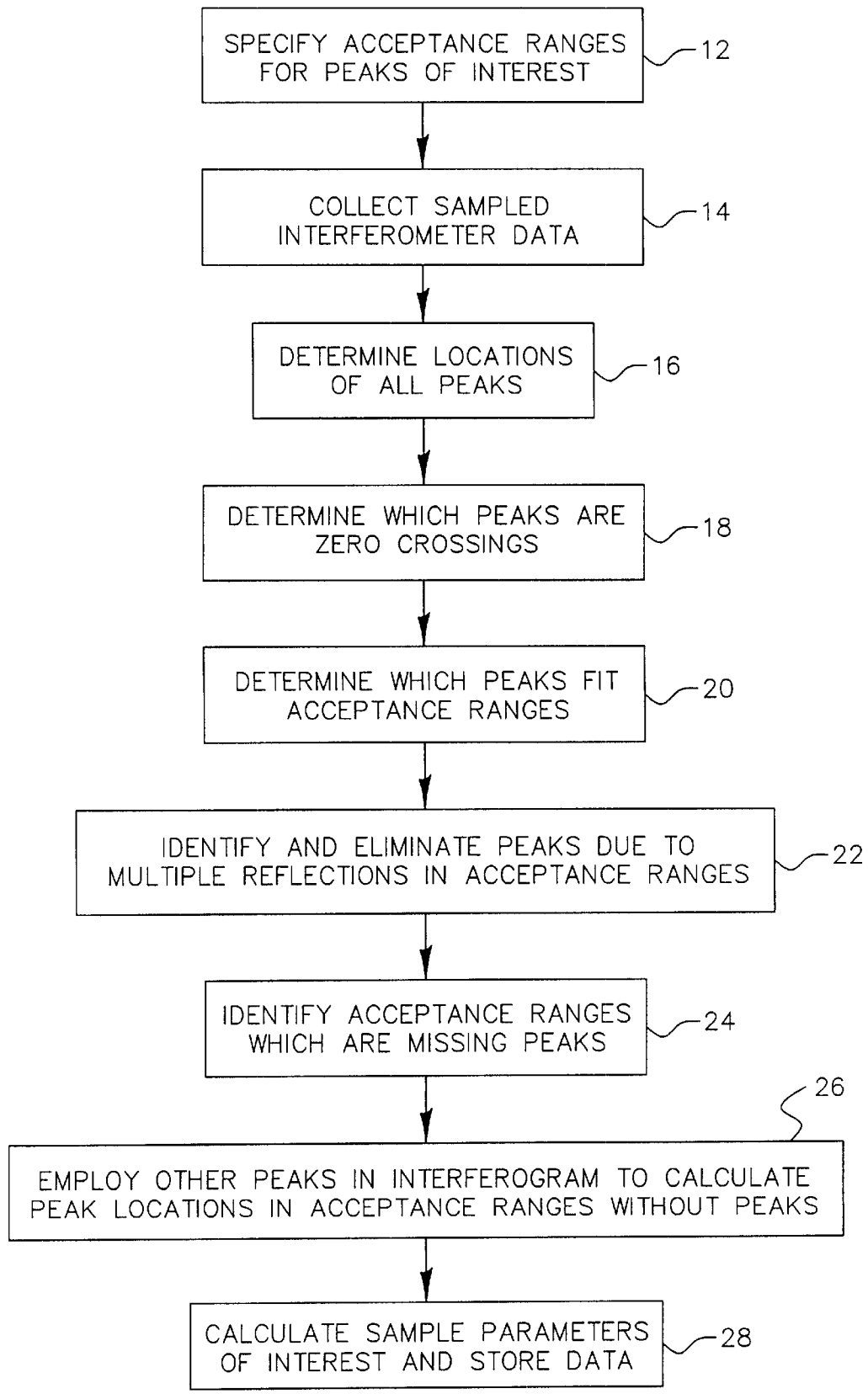
FIG. 2 is a flow chart showing the steps of the method of this invention for identifying peaks in FIG. 1.

Referring to FIG. 2, the method can be generally described as first specifying ranges (12) for peaks of interest. The ranges are determined based on a prior knowledge of the tolerance limits of the locations of the reflective surfaces in a sample being measured. The acceptance ranges are specified with respect to the zero crossing positions, which represents the locations of the largest peaks in the interferogram. Next the interferometer data is collected and stored (14), and all peaks in the interferogram are located (16) on a distance scale. Peaks are usually located by comparing to a amplitude threshold level K. The exact locations of the peaks are determined by the use of a peak location algorithm as described in U.S. Pat. No. 5,596,409. Next, it is determined which peaks are due to interferometer zero-crossings (18). The zero-crossing peaks are in general the largest peaks in the interferogram. A determination is next made as to which peaks in the interferogram fall within the acceptance ranges (20). In order to perform this step all peak distances to the nearest zero crossing peaks are calculated. Next, peaks which are due to multiple reflections are identified and removed (22) from consideration in the acceptance ranges. These multiple reflection peaks can be identified by the fact that they occur at an exact multiple distance of another peak from the zero crossing, or that they are the sum or difference of the distances of two or more other peaks from the zero crossing. Acceptance ranges without any peaks are then identified (24). Finally, other peaks in the interferogram are employed to calculate (26) the positions of peak locations within these acceptance ranges and the sample parameters of interest are calculated and stored (28).

Figure 3:
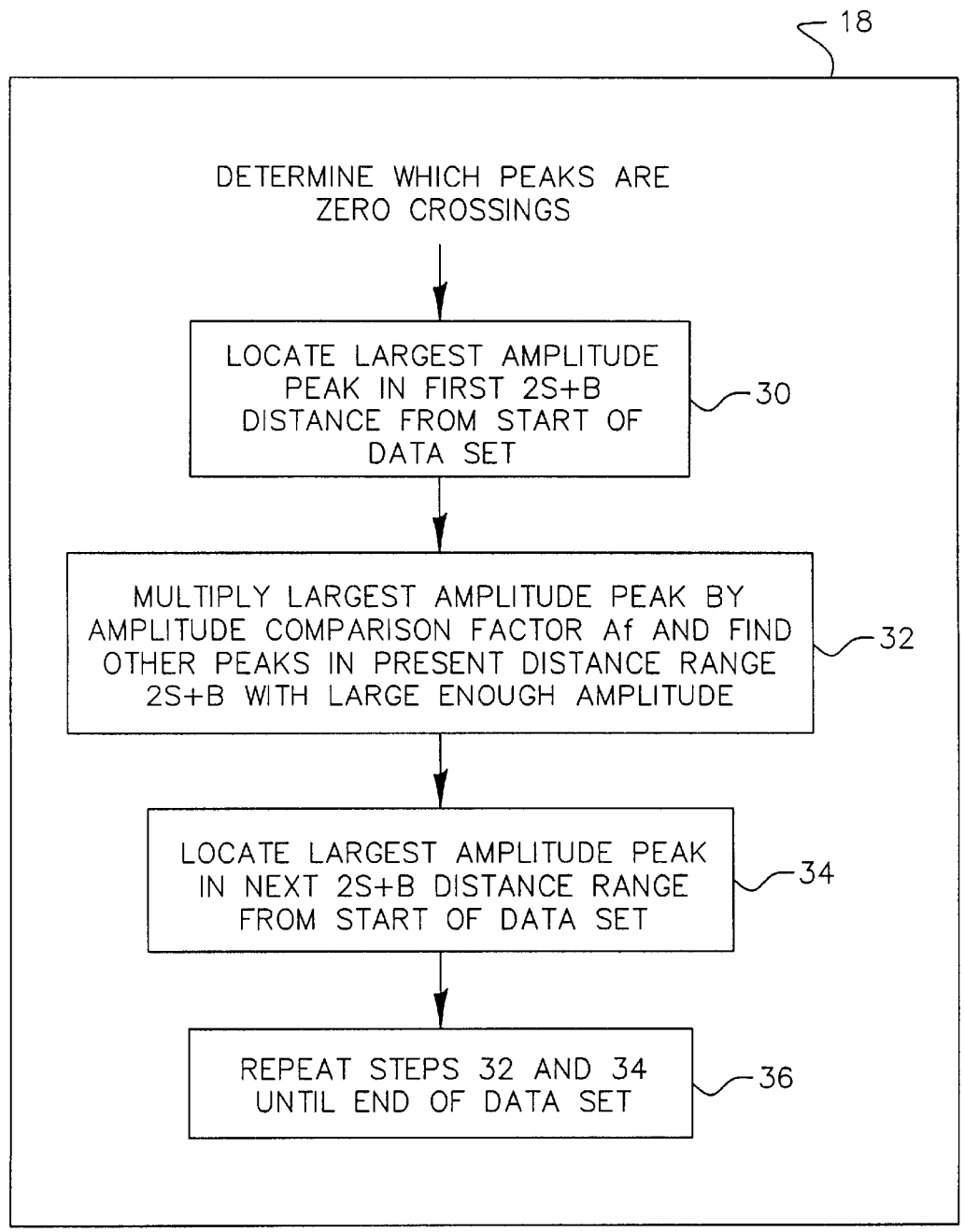
FIG. 3 is a flow chart showing the steps of determining which peaks are zero crossing peaks.

Referring to FIG. 3 the step (18) of identifying which peaks are due to interferometer zero-crossings is described in further detail. In order to locate the zero crossings properly, knowledge of the interferometer scanning parameters is needed. In the general case the interferometer path length is alternately increased and decreased by a distance S±B/2 where S is the average interferometer scan amplitude, and B is a small buffer to accommodate variations in the motor scanning amplitude from cycle to cycle. There is also an interferometer scan offset parameter P that indicates the location of the start of the interferometer scan with respect to the zero-crossing location. First we determine the largest amplitude peak in the first 2S+B distance from the start of the data set (30) and define this as a zero-crossing peak. An appropriate amplitude comparison factor Af is used for distinguishing zero crossing peaks from other kinds of peaks in the interferogram trace. For an autocorrelation based interferometer, an appropriate Af is >0.5. We usually choose an amplitude comparison factor higher than this to accommodate high levels of noise and the fact that the signal intensity may vary greatly as a function of position on the sample under test. The largest amplitude zero crossing peak's amplitude is multiplied by Af and other peaks in the present distance range 2S+B with amplitudes greater than the above product are also selected as zero crossing peaks (32). Next the largest amplitude peak in the next 2S+B distance range from the start of the data set is found and is selected as a zero-crossing peak (34). Steps 32 and 34 are then repeated until the end of the collected data set (36).

Figure 4:
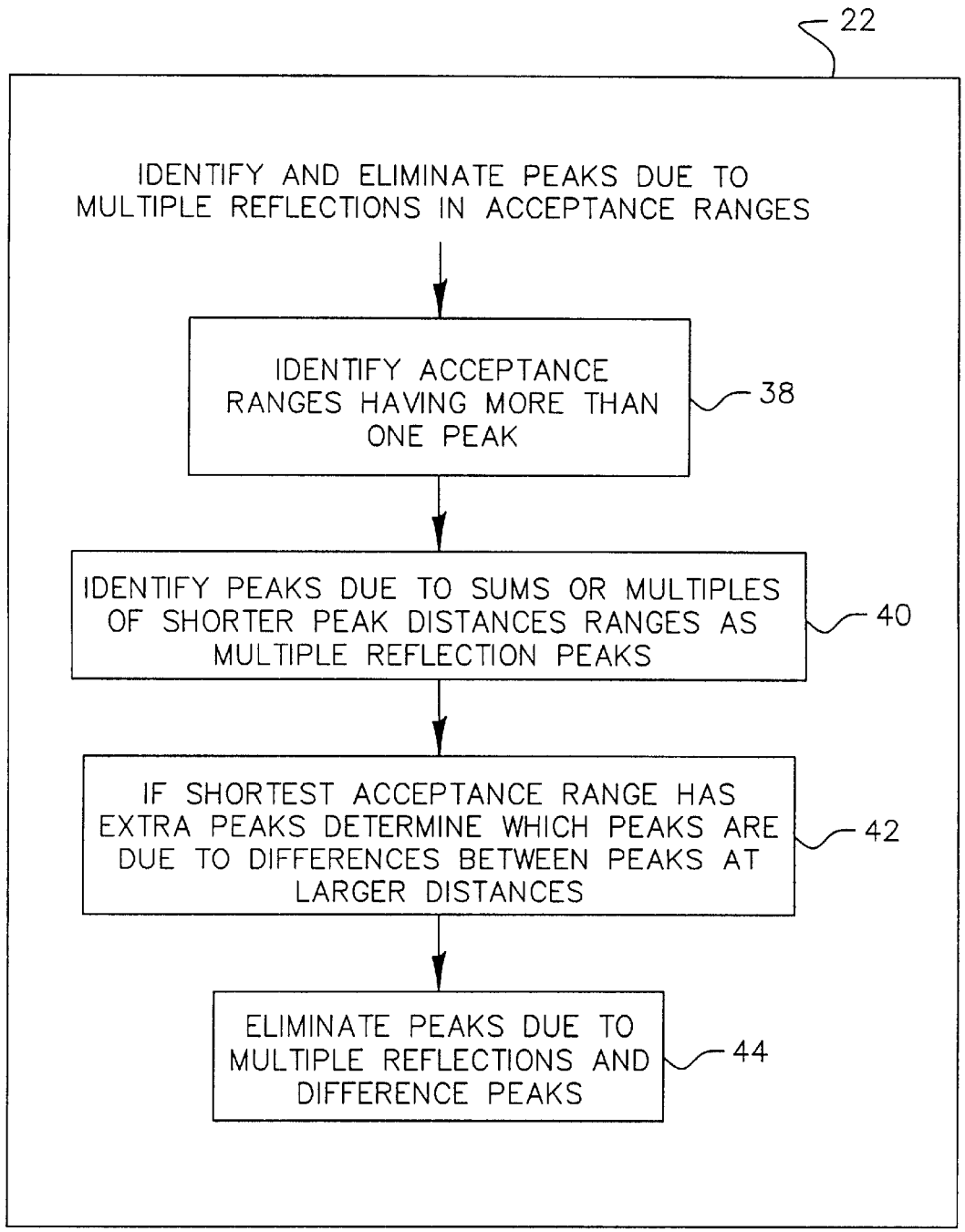
FIG. 4 is a flow chart showing in more detail the step of identifying and eliminating peaks due to multiple reflections.

Referring to FIG. 4, the step (22) of identifying peaks due to multiple reflections will be described in further detail. First the acceptance ranges having more than one peak are identified (38). Next, the peaks due to multiple reflections from shorter distance peaks are identified (40). If the shortest acceptance range contains extra peaks, the peaks that are due to differences between peaks at larger distances are determined (42) and eliminated (44).

Figure 5:
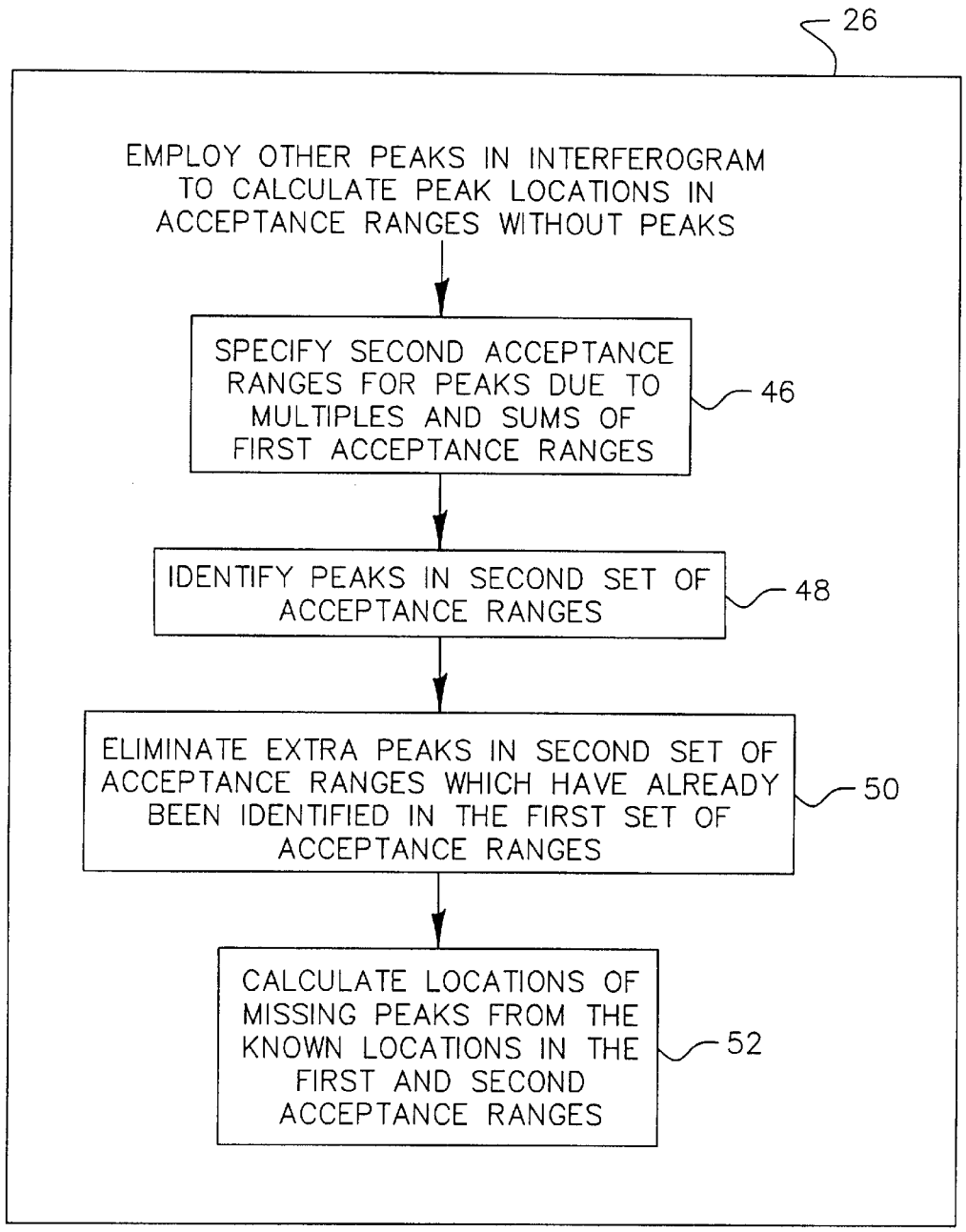
FIG. 5 is a flow chart showing in more detail the step of calculating peak locations in acceptance ranges without peaks.

Referring to FIG. 5, the step of calculating peak locations in acceptance ranges without peaks (26), includes the steps of specifying a set of second acceptance ranges for peaks due to multiples and sums of first acceptance ranges (46). Next, peaks in the set of second acceptance ranges are identified (48) and extra peaks in the second set of acceptance ranges which have already been identified as peaks of interest are eliminated from consideration (50). Finally, the location of missing peaks is calculated (52) from the known locations in the first and second acceptance ranges.

While the present invention can be directed to any interferometric data, the preferred embodiment of the present invention is described below in relation to interferometric data obtained when positioning an imager or image sensor (e.g., a Charge Coupled Device (CCD)) within an electronic camera. More particularly, as is well known, to capture an image of an object using a camera, an image beam is directed through a lens and onto an image-forming medium disposed at an image plane. In conventional photography, photographic film is disposed at the image plane and the image of the object is captured on photographic film. In electronic photography, an imager or image sensor is disposed at the image plane, and the image of the object is captured electronically. For both conventional and electronic photography, it is necessary to properly position the image plane and the lens relative to each other within the camera to provide a focused image. To properly position the image plane, the position of the image plane needs to be determined. Using interferometry, such a position can be determined relative to a reference surface or reference plane on the camera.

Figure 6:
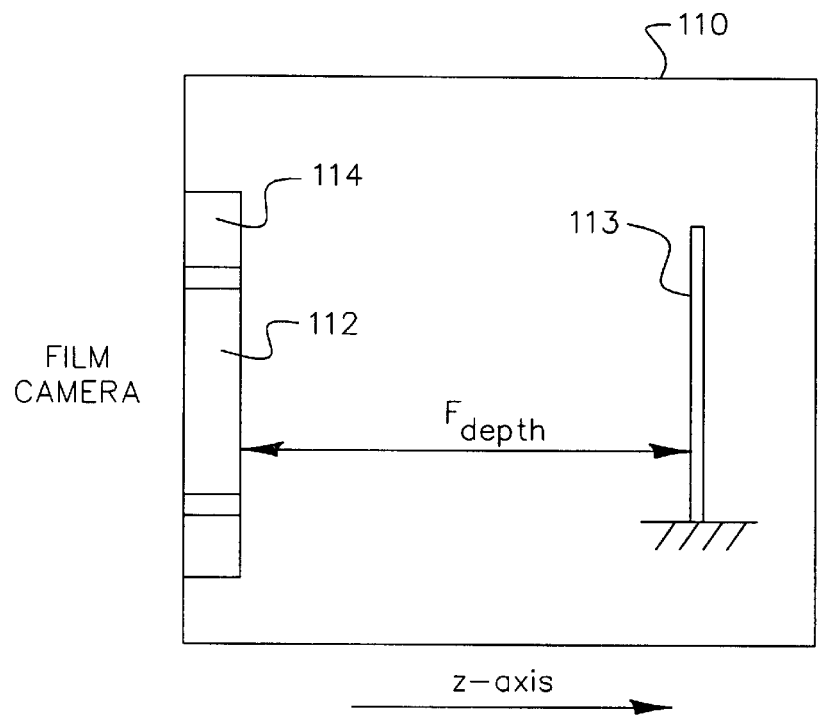
FIG. 6 is a schematic view of a lens mounted within a film camera body.

Referring now to FIG. 6, a lens 112 is mounted to a camera body 110 by means of a camera lens mount 114. The distance at which lens 112 focuses light in the camera body is referred to as the focal depth $F_{depth}$ of the lens in air, measured along the z-axis. The focal depth $F_{depth}$ can be determined by means known to those skilled in the art. In a conventional camera employing photographic film 113 as the image media, the film is positioned at the focal depth $F_{depth}$ of the lens. FIG. 6 illustrates film 113 positioned at the focal depth of the lens, to provide a focused image. Known means (not shown) such as film rails, may be employed to position film 113 at the focal depth $F_{depth}$. Hereinafter, the terminology "in-focus position" refers to a position at which an imaging media is positioned to provide an in-focus image.

Figure 7:
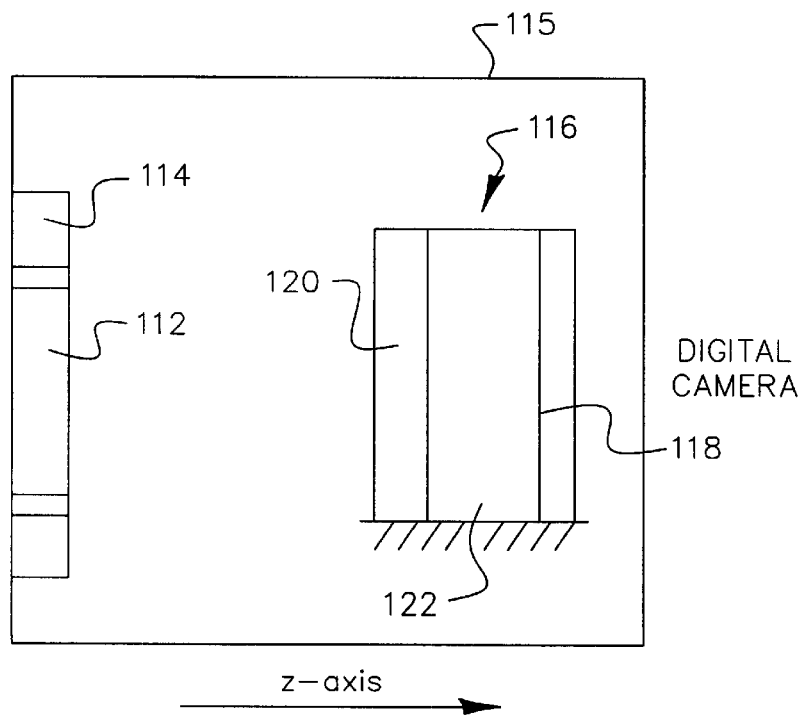
FIG. 7 is a schematic view of a CCD mounted within a digital camera body.

Referring to FIG. 7, in a digital camera body 115, lens 112 is typically mounted to the digital camera by means of camera lens mount 114. An image sensor 116 is employed as the imaging media. Image sensor 116 typically comprises an imager plane 118 referring to an active surface of the image sensor. Image sensor 116 generally further comprises an optically transparent plate 120 (hereinafter referred to as imager cover plate 120) having an index of refraction n.

Imager plane 118 is spaced from imager cover plate 120 such that a gap 122 is interposed between the imager plane and the plate. Typically, the imager plane and the transparent plate are hermetically sealed with a defined gap 122.

As indicated above with regard to a conventional camera, the distance at which lens 112 focuses light is referred to as the focal depth $F_{depth}$ of the lens. However, in a digital camera, the presence of imager cover plate 120 (disposed intermediate the lens and the image sensor) affects the in-focus position. Accordingly, an in-focus position $F_I$ for imager plane 118, taking into account the presence of imager cover plate 120, is determined by:

$$F_I = F_{depth} + \text{Delta} \quad \text{(Eq. 1)}$$

where $$\text{Delta} = t\left(1 - \frac{1}{n}\right) \quad \text{(Eq. 2)}$$

with t being the thickness of imager cover plate 120 and n being the index of refraction of imager cover plate 120.

Figure 8:
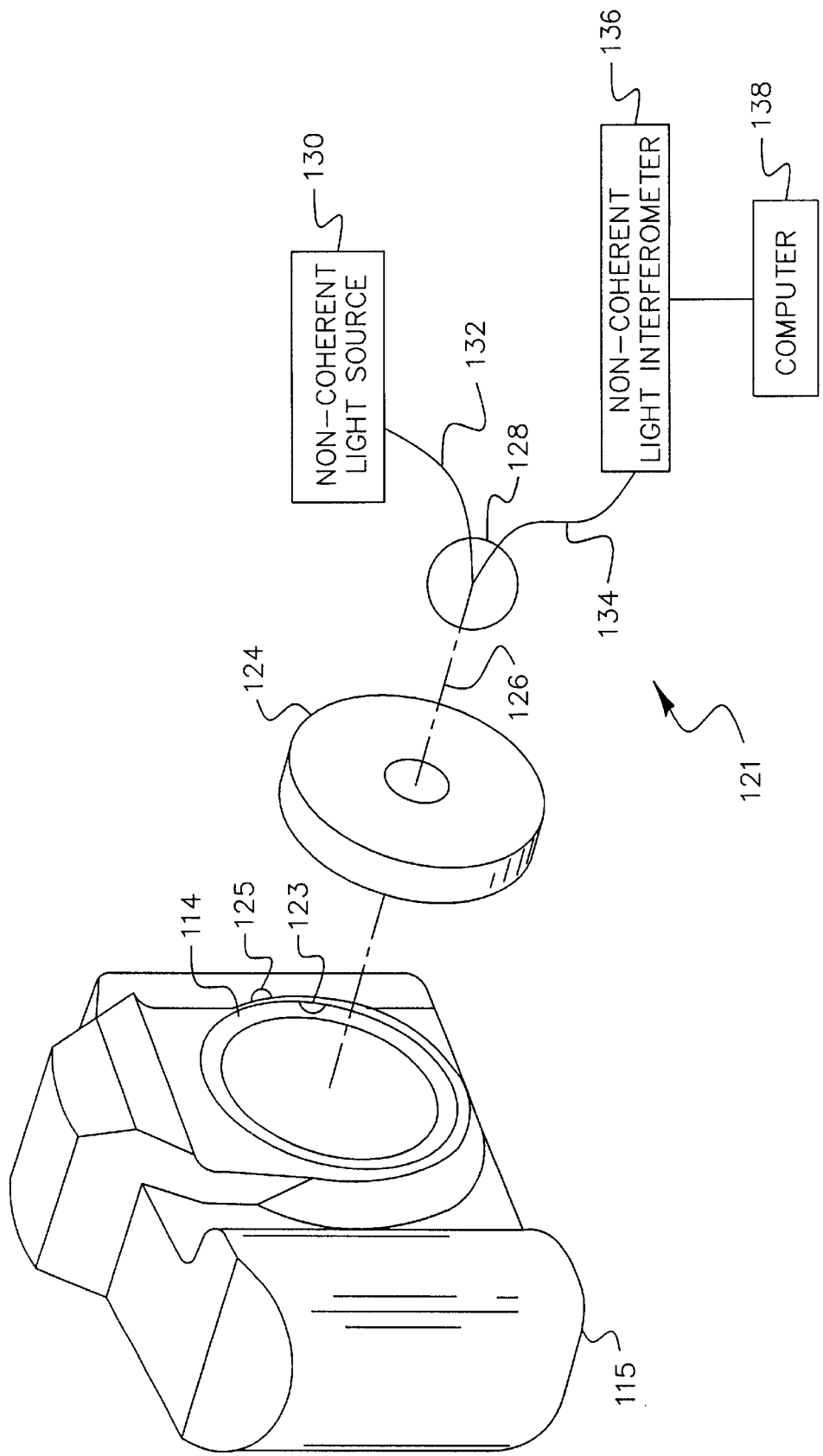
FIG. 8 is a schematic diagram showing a non-coherent light interferometric measurement apparatus for determining the position of an image sensor relative to a reference surface on a digital camera.

FIG. 8 shows a non-coherent light interferometric measurement apparatus 121 for determining the position of image sensor 116 relative to a reference surface on the digital camera. The apparatus allows a user to verify that the position of imager plane 118 (see FIG. 7) is within a desired tolerance. If the position of imager plane 118 is outside the desired tolerance, the image sensor can be re-positioned to move imager plane 118 to a desired position, such as the in-focus position $F_I$.

Lens 112 (see FIG. 7) is generally mounted to digital camera body 115 by lens mount 114. Conventional means (not shown) are known to facilitate mounting of the lens to the camera body. Such means may include: a screw lens mount wherein screw threads allows installation of the lens to the camera body; a bayonet lens mount wherein the lens is placed in keyed-contact and rotated over a mating flange on the camera body with a twist of about 45 degrees; or a breechlock lens mount wherein a knurled collar on the back of the lens fits over a mating flange on the camera body. To secure the mounting, the lens mount may include a locking means to lock the lens to the lens mount. Similarly, to unlock the lens from the lens mount, an unlocking means may be included.

According to the present invention, to determine the position of imager plane 118, lens 112 is removed from digital camera body 115. Since lens 112 is removed, the position of imager plane 118 is determined relative to a reference surface on digital camera body 115. While various surfaces (including, but not limited to, components of the digital camera body) may be used as a reference surface, for ease of discussion, camera lens mount 114 will provide the reference surface. Therefore, the position of imager plane 118 will be discussed as being determined relative to camera lens mount 114.

Referring to FIG. 8, a removable optical probe assembly 124 is mounted to camera lens mount 114 to securely, but temporarily, attach optical probe assembly 124 to digital camera body 115. A suitable optical probe assembly 124 is disclosed in U.S. Pat. No. 5,757,485, Marcus et al., and U.S. Pat. No. 5,757,486, Marcus et al., commonly assigned and incorporated herein by reference. Preferably, optical probe assembly 124 incorporates the means to allow the assembly to be mounted to digital camera body 115 by means of, for example, a bayonet lens mount wherein the assembly would slip over a mating flange on the camera body with a twist of about 45 degrees. To temporarily secure the mounting, a lock 123, for example a spring loaded locking pin, locks optical probe assembly 124 to camera lens mount 114. To unlock optical probe assembly 124 from camera lens mount 114, a release 125 such as a spring loaded release pin, is employed thereby allowing optical probe assembly 124 to be readily released from digital camera body 115. The lock 123 and release 125 may optionally be employed to lock and unlock, respectively, lens 112 to camera lens mount 114.

Optical probe assembly 124 is preferably coupled to a 1×2 optical coupler 128 by a single mode optical fiber cable 126. Preferably, connectors and patchcords (not shown) of variable length (preferably patchcords which terminate with a low back reflection connector such as an FC type fiber optic connector) are disposed between optical coupler 128 and optical probe assembly 124 to permit portability for the apparatus and to permit remote location mounting. A non-coherent light source 130, such as an LED (Light Emitting Diode), is coupled into a single mode fiber 132 and passes through 1×2 optical coupler 128. A suitable non-coherent light source 130 is a high bandwidth (approximately 40–120 nm) 1300 nm center wavelength LED having 5–100 μwatts of coupled optical power.

Figure 9:
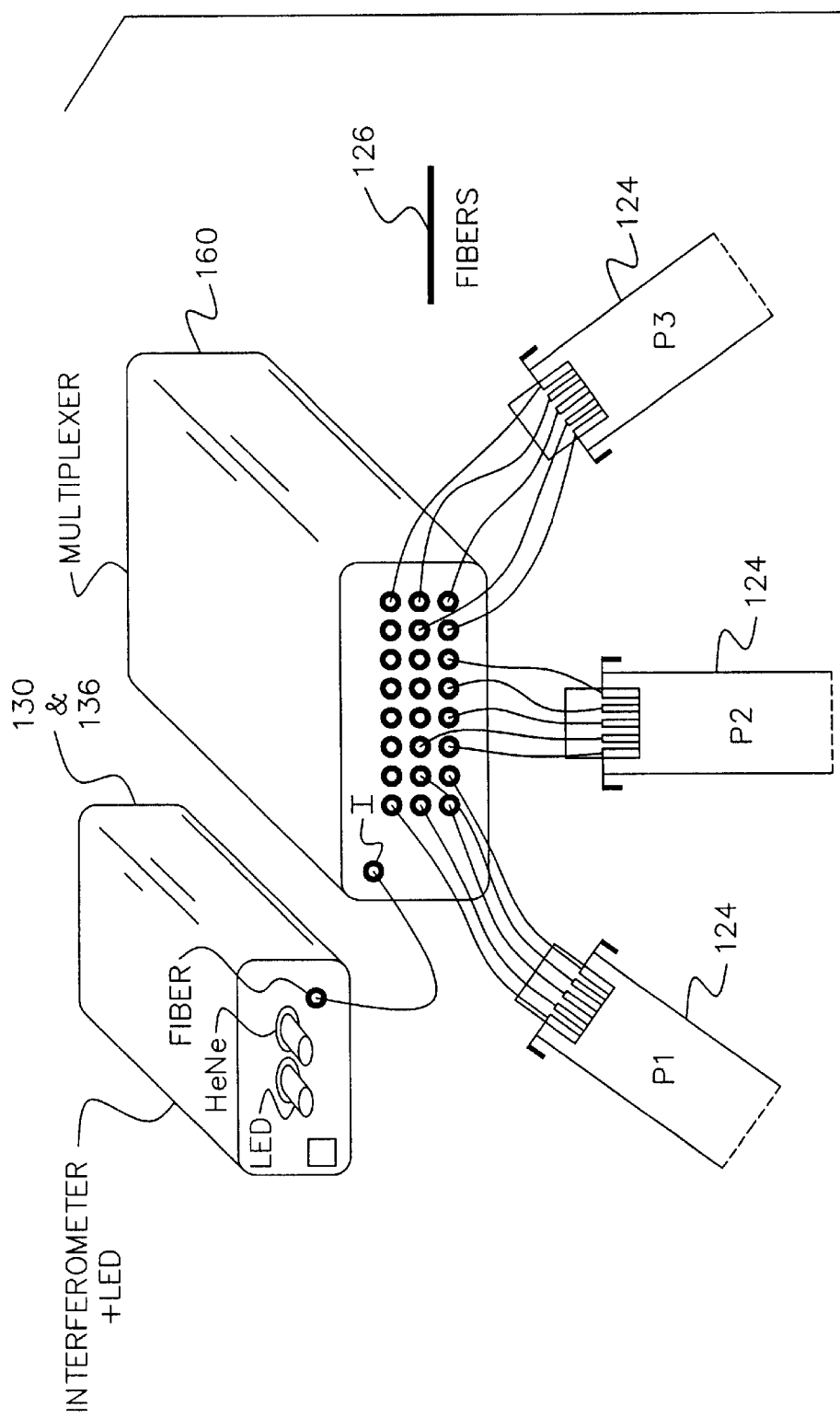
FIG. 9 is a schematic diagram showing a multiplexer in association with a plurality of optical probe assemblies employed with the method of the present invention.

Optical probe assembly 124 may include multiple lenses and fibers for measurement of multiple locations over the surface of imager sensor 116. In the present invention, an optical multiplexer 160 (shown in FIG. 9) would be disposed between non-coherent light source 130 and optical probe assembly 124. Each probe measurement location is mapped to a different multiplexer fiber port. As shown in FIG. 9, a plurality of optical probe assemblies 124 are shown as P1, P2, and P3.

Generally, in operation, light from non-coherent light source 130 is input into optical multiplexer 160, then travels along optical fiber cable 126, transmitted through optical probe assembly 124, and is incident on image sensor 116. The light is reflected from each of the surfaces of image sensor 116, and passes back through optical probe assembly 124 into optical fiber cable 126. The reflected light then passes through 1×2 optical coupler 128 (see FIG. 8) into an optical fiber 134, which is introduced into a non-coherent light interferometer 136. Preferably, interferometer 136 is of a Michelson configuration, though a non-Michelson configuration has been found suitable. Associated with non-coherent light interferometer 136 is a digital processor 138, such a personal computer equipped with an analog to digital converter and digital controls, for controlling the interferometer scanning parameters and for collecting, manipulating, analyzing and storing data.

Figure 10:
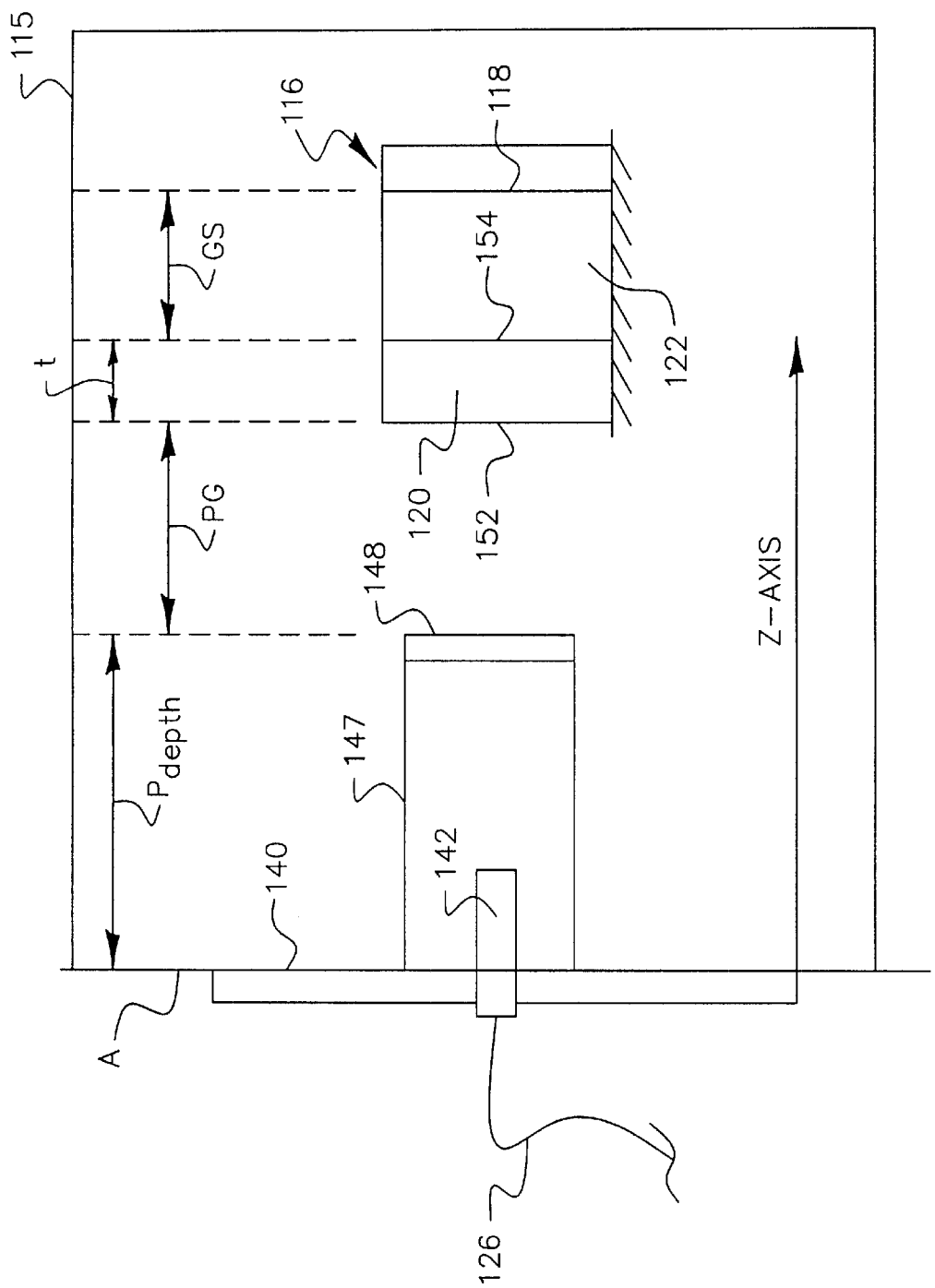
FIG. 10 is a schematic diagram showing of the relationship of an optical probe assembly and a CCD when the optical probe assembly is mounted to the camera body.

The orientation of the optical probe assembly 124 mounted to digital camera body 115 is shown in FIG. 10, wherein optical probe assembly 124 includes a probe mounting surface 140, an optical probe 142, a pellicle holder 147 and a pellicle 148. Further illustrated is a front surface 152 of transparent plate 120 and a back surface 154 of transparent plate 120, and a camera reference surface disposed at plane A. The lens flange-mounting ring 114 of the camera body would define a suitable reference plane A.

Figure 11:
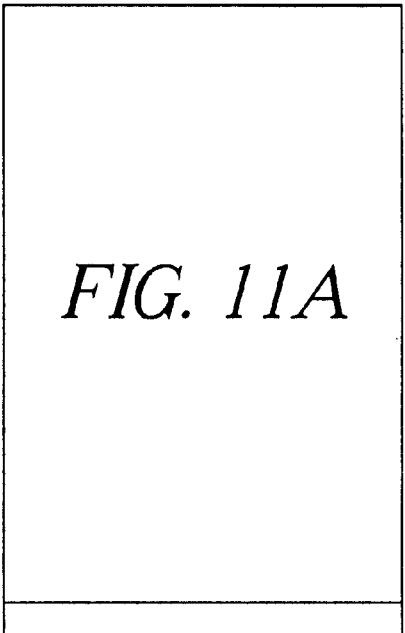
FIG. 11 is a flow chart of a method of calibrating a camera in accordance with the present invention.
Figure 11:
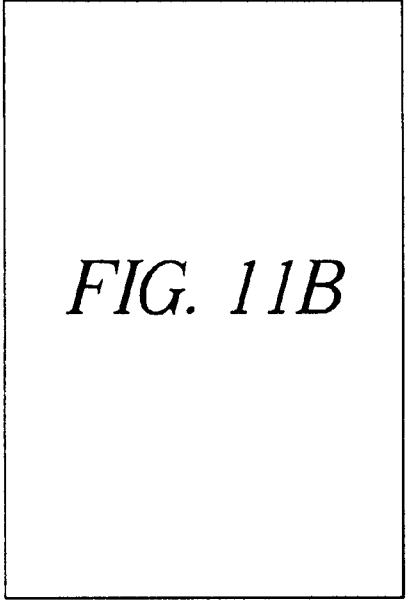
Figure 11A:
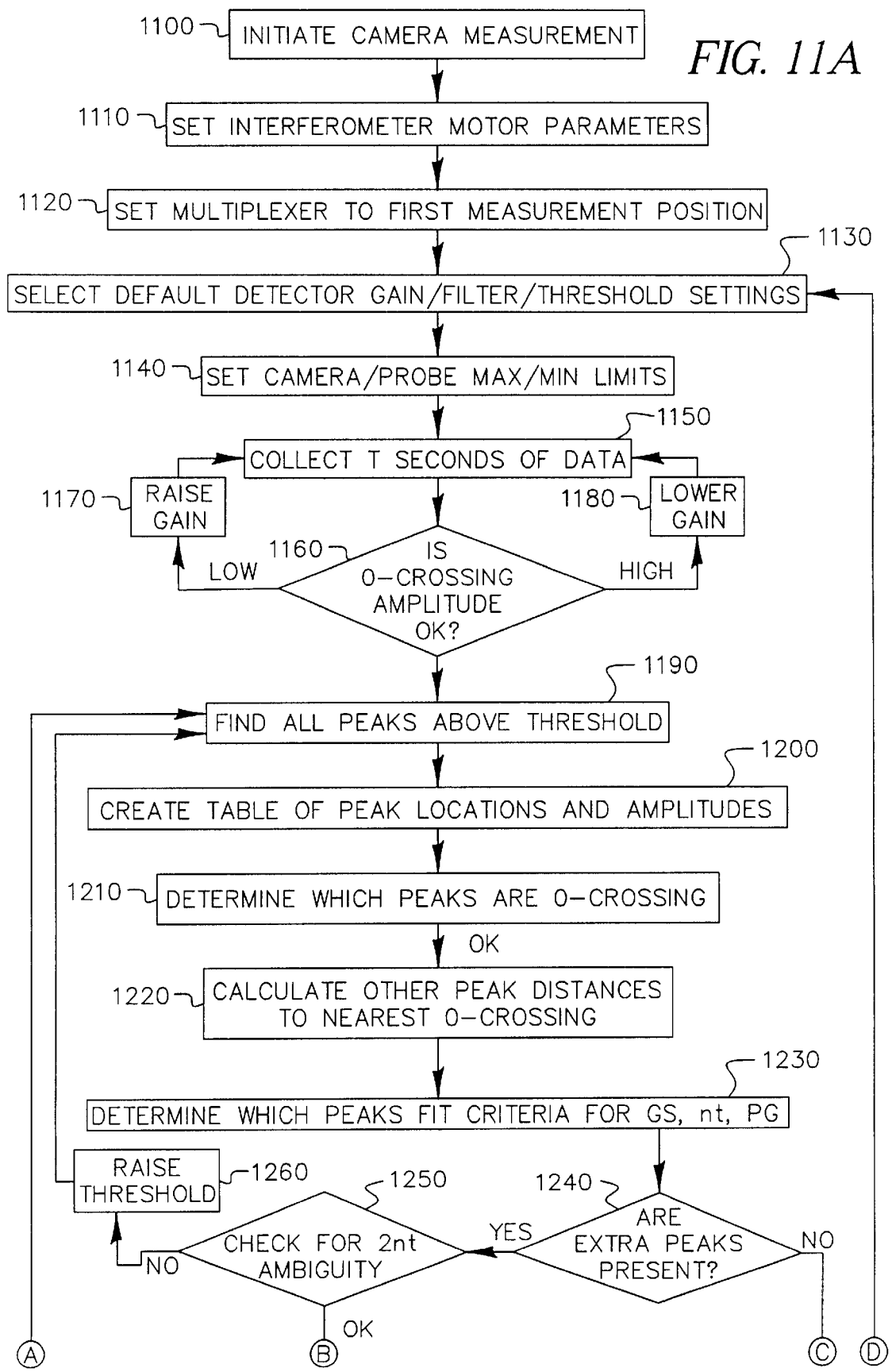
Figure 11B:
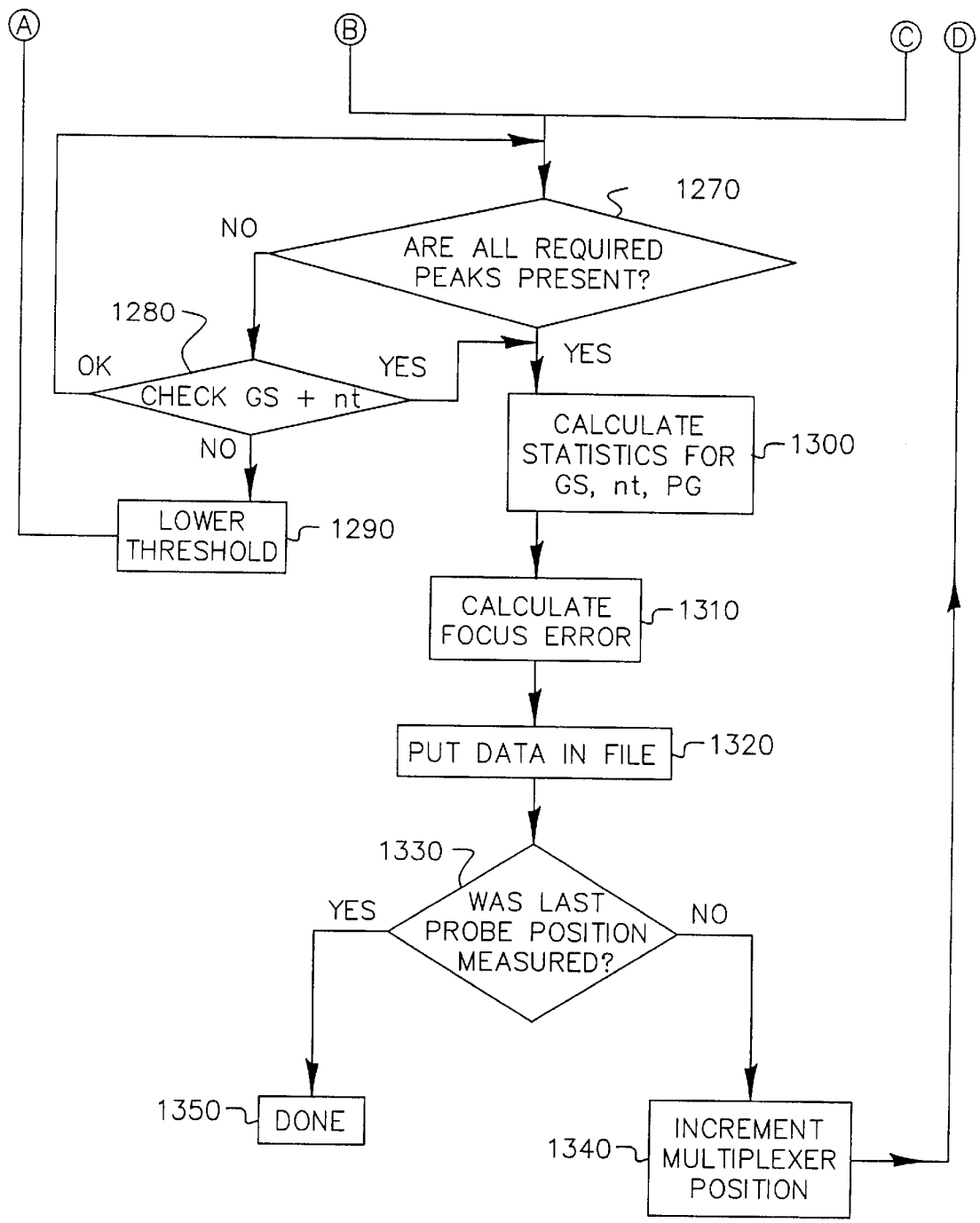

The method according to the present invention will now be described with reference to FIG. 11, which illustrates a flow chart of the method in accordance with the present invention, and FIG. 12 which shows an interferogram obtained by the apparatus shown in FIG. 8. According to the method, the values of the imager gap (GS), the transparent plate optical path (nt) and the distance from the pellicle to the front surface of the transparent plate (PG) are determined, wherein t is the thickness of transparent plate 120 (as defined in FIG. 10). The transparent plate has a known index of refraction n in this case, and it is assumed that the distance $P_{depth}$ is known from an external measurement. The actual depth of the imager plane 118 relative to the camera lens flange mounting ring plane (probe mounting surface) 140 ($D_{actual}$) is given by $$D_{actual}=P_{depth}+PG+t+GS \qquad (Eq.\ 3)$$

and the Focus Error ($D_F$) is given by $$D_F=F_r-D_{actual}. \qquad (Eq.\ 4)$$

To initiate a camera measurement (step 1100), an operator indicates parameters of the camera being measured as well as the optical probe assembly utilized in the measurement. Such parameters can be pre-set defaults if a computer-based system is utilized. This may be desirable if multiple camera models are measured or multiple optical probe assemblies are utilized. Default parameters for the particular optical probe assembly selected include probe multiplexer positions corresponding to probe measurement positions, control of the interferometer motor scanning parameters, and the type of imager disposed within the camera model.

Specific parameter default values which are set include: an approximate interferometer motor scan distance/amplitude S; a measurement data collection time T (seconds); an interferometer motor scanning frequency F; and an interferometer motor start position offset P. The motor scan offset P is the scan distance beyond the zero crossing of the interferometer that the interferometer motor scan starts at (step 1110).

Figure 12:
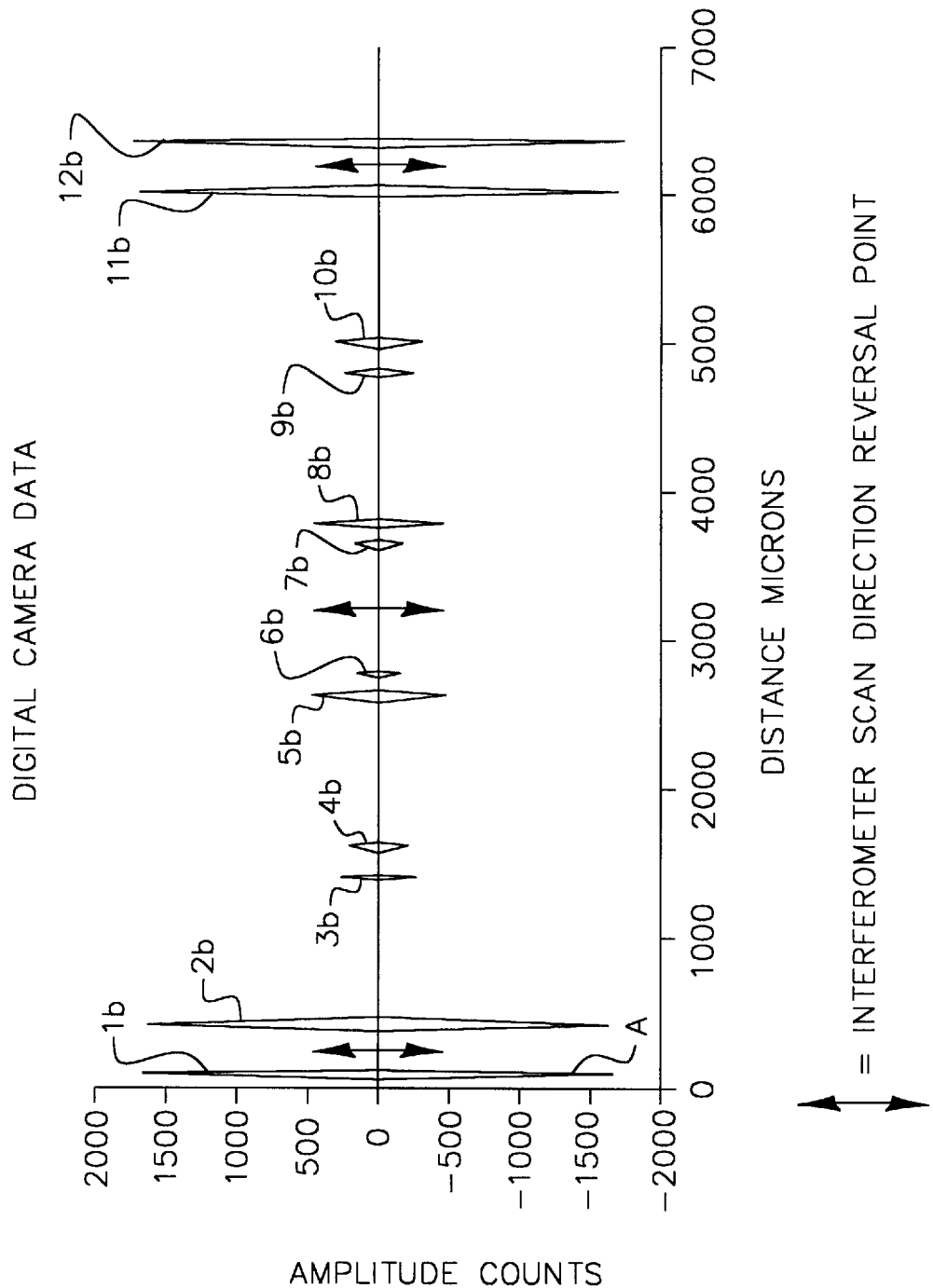
FIG. 12 is an interferogram illustrating a first example of the method in accordance with the present invention.

Referring to FIG. 12, the motor scan offset P is the distance between the first zero crossing peak and the first motor scan direction reversal point (a reversal point being shown as vertical arrows in FIG. 12). The motor scan offset P is selected based on the desired application parameters. In this case it is desirable not to make the interferometer scan symmetric with regard to the zero-crossing, and is preferably selected so as to make the zero-crossing Peaks 1b and 2b adjacent to each other. The interferometer motor scan amplitude S in this case has been chosen so that Peaks 6b and 7b (of FIG. 12) are farther apart than Peaks 1b and 2b but less than twice the distance between Peaks 2b and 3b of FIG. 12. The distance between Peaks 2b and 3b is the distance between the first zero-crossing peak and the peak defining the first feature of interest (i.e., the imager gap GS). For Applicants' particular example illustrated in FIG. 12, S is approximately 2960 µm; and P is approximately 165 µm as shown in Table form in FIG. 13 since P is equal to half of the adjacent zero-crossing distance.

A default value for a motor amplitude variation buffer value B is set to account for uncertainty in an actual interferometer scan distance/amplitude. Values of B of 10–25 µm have been found suitable for Applicants' application. The value of B should be larger than the maximum scan-to-scan amplitude variation of the interferometer motor, but should be smaller than the closest distance between zero-crossing peaks on motor reversals (as shown as Peaks 1b and 2b or Peaks 11b and 12b in FIG. 12).

A suitable value for a measurement data collection time T is 1 to 2 seconds. A multiplexer may be used as shown in FIG. 9 to make measurements at multiple locations within a camera. Multiple optical probe assemblies 124 for use with different camera models (e.g., such as P1, P2, and P3 as shown in FIG. 9) may also be connected to optical multiplexer 160. The different camera models and imager dimensions could require different configurations of probe mounts, thus necessitating different optical probe assemblies. The multiplexer is set to a first measurement position (step 1120).

Default settings for the high pass and low pass filters are defined, as are amplifier gains and default measurement thresholds (steps 1130). These values may be based on the particular optical probe assembly being used and the particular camera body being processed, and include a default threshold level KG; a default amplifier gain level g0; a zero-crossing peak lower amplitude threshold value Zl; and a zero-crossing peak higher amplitude threshold value Zh.

In step 1140, camera model specific criteria ranges are defined, including: allowable distances from zero-crossing peak to each of the imager gap peak (GS), transparent plate peak (nt), and pellicle peak (PG), with the allowable range criteria being:

$$GS_{min} \leq GS \leq GS_{max};$$

$$nt_{min} \leq nt \leq nt_{max};\ \text{and}$$

$$PG_{min} \leq PG \leq PG_{max}.$$

Where $GS_{min}$, $GS_{max}$, $nt_{min}$, $nt_{max}$, $PG_{min}$ and $PG_{max}$ are the minimum and maximum allowed values of GS, nt and PG respectively. The interferometer scan distances GS, nt and PG are shown schematically in FIG. 14 for reference.

In order to ensure appropriate data analysis other parameters other relationships between the various camera parameters need to be known. In our case these other necessary relationships are that $$GS<nt$$

$$GS+nt<PG.$$

The optical probe has been constructed so that $PG>GS_{max}+nt_{max}$.

With the measurement initiated, T seconds of interferometric data is sampled using an amplifier gain level g0, and collected and stored in a sequential data file (step 1150). As indicated in the background references above, the non-coherent light interferometer data is preferably sampled at constant distance intervals and is triggered by zero-crossings of the laser interferometer data signal. Applicants have discovered that sampling at constant distance intervals of $3\lambda/4=0.474743$ µm has been found suitable, wherein λ is the wavelength of the laser light source disclosed in U.S. Pat. No. 5,659,392, Marcus et al., and U.S. Pat. No. 5,596,409, Marcus et al., commonly assigned and incorporated herein by reference. When sampling the interferometric data, the zero-crossing signal amplitude is analyzed to determine if the value is appropriate (step 1160). If low (i.e., if less than the absolute value of Zl), the gain of the interferometers photodetector is raised (step 1170) and step 1150 is repeated. If high (i.e., if greater than the absolute value of Zh), the gain is lowered (step 1180) and step 1150 is repeated. Applicants have employed a 12 bit A-D converter having a maximum number of counts of +/−2047 counts.

Referring again to FIG. 12, which illustrates data for the approximately first 0.10 second of a scan, the location of the zero-crossing peaks are determined by first locating the largest amplitude peak from the start of the data acquisition over a distance range 2S+B. Once the largest amplitude zero-crossing peak is located, the amplitude of the peak is determined and compared to default settings to determine if the measurement amplifier gain is appropriate. If the amplitude of the peak is less than the user-defined zero-crossing peak lower amplitude threshold value Zl, then the gain is increased, for example, by a value of 6 dB. If the amplitude of the peak is saturated (i.e., greater than the user-defined zero-crossing peak higher amplitude threshold value Zh), then the gain is lowered, for example, by a value of 6 dB. If the gain is adjusted, the data is re-collected and stored (step 1150). For the example illustrated in FIG. 12, Peak 1*b* is the largest amplitude and it is in an acceptable range for gain.

Once the zero-crossing amplitude is appropriate, the sampled interferometric data collected and stored in a sequential data file (step 1150) is processed starting with step 1190. First, the interferometric peaks are processed to find the approximate location of all the interferogram peaks above a user-defined threshold level KG (step 1190). The location is determined with respect to a distance from the beginning of the stored sequential data file, defined as zero-distance. A quantitative peak location algorithm such as that defined in the incorporated references is applied to determine the actual location relative to the beginning of the data set for each of the peaks above the user-defined threshold level K. A table of the peak locations and peak amplitudes is generated (step 1200), an example of which is shown in FIG. 13 (corresponding to the peak locations illustrated in FIG. 12). For the instant example illustrated in FIG. 12, 12 peaks were obtained, and their locations and amplitudes calculated and stored are shown in FIG. 13.

Generally, the first column of FIG. 13 shows the peak number corresponding with FIG. 12; the second column shows the peak distance from the beginning of the collected sampled data; the third column shows the peak amplitude; and the fourth column shows the nearest zero-crossing distance. The numbers of the fifth column of FIG. 12 show the distance between adjacent zero-crossing peaks or the distance from Peak 6*b* to Peak 7*b* (i.e., the furthest peaks from the zero-crossing peaks). The sixth column shows the scan direction reversal locations, while the seventh column shows the scan amplitude S. Columns 5–7 of FIG. 12 can be used to verify that the default parameters, including amplitude S, offset P, and motor amplitude variation buffer value B are within the expected ranges.

The interferogram peaks are then analyzed to determine which of the peaks are zero-crossings (step 1210). This is accomplished by first locating the largest amplitude peak from the data table at the start of the data set over a distance range of 2S+B. This largest amplitude peak is referred to as zero-crossing Peak A. Note that the zero crossing peaks have the largest amplitude, and are generally at least a factor of 2 greater in amplitude than any other interferogram peak obtained with this type of interferometer. Referring to FIG. 12, Peaks 1*b*–10*b* are disposed within the range of 2S+B, and peak 1*b* is the largest peak and therefore defined as Peak A.

With the location of Peak A, the remaining peaks within the 2S+B range (from the beginning of the data set) are processed to determine the peaks which are also zero-crossing peaks. Note that an amplitude comparison factor Af may be used to distinguish zero-crossing peaks from other types of peaks in the data table as shown in FIG. 12. The remaining peaks shown in the data table are compared with the value of the product of Af times the amplitude of Peak A. Any other peaks having an amplitude greater than this product are also defined as zero-crossing peaks. One such peak is peak 2*b* in FIG. 12. Applicants have determined an acceptable value of Af to be about 0.6–0.75, preferably 0.65 or 0.67. Referring to FIG. 12, Peaks 1–10 are disposed within the range of 2S+B, and Peak 2 has an amplitude greater than Af times the amplitude of peak A, and is noted in the figure as zero-crossing peak 2*b*.

After all the zero-crossing peaks are located within the distance range 2S+B, the remaining collected and stored data is analyzed to locate all of the remaining zero-crossing peaks (step 1210). To accomplish this, all the peaks are selected which have absolute amplitude greater than the value of the product of Af times the absolute amplitude of peak A. Referring to FIG. 13, column 3, Peaks 11*b* and 12*b* are selected as zero-crossing peaks and given a Zero Crossing Distance of zero (shown in column four). Each time a zero-crossing peak is found it is given a zero-crossing distance of 0 in column 4 of the Table in FIG. 13. For a 10 Hz measurement rate there will be about 20 zero-crossing peaks per second of data collection.

With the zero-crossing peaks located, the locations of the peaks are processed to determine a distance to the nearest zero-crossing peak (step 1220). For the zero-crossing peaks, Peaks 1*b* and 2*b* of FIG. 12, these peaks are given a Zero Crossing Distance of 0 as shown in Column 4 of the Table in FIG. 13.

However, a determination is first made regarding which is the closest zero-crossing peak to a particular peak, referred to as a reference peak. This is accomplished by first calculating the distance between zero-crossing Peaks 1*b* and 2*b*. If this calculated distance is less than twice the value of GS, then the zero-crossing peak which is a farther distance from the origin is selected as a reference peak. If the calculated distance is greater than twice the maximum acceptance value for the pellicle gap PG then the closest peak from the origin is selected as the reference peak. If the calculated distance is greater than twice the maximum acceptance value for the pellicle gap PG, then Peak 1*b* would not be present in FIG. 12, and the collected data would begin before Peak 2*b*.

For FIG. 12, Peak 2*b* is the reference peak. FIG. 13 shows the sequence of calculation of distances from the nearest zero-crossing for the 12 peaks shown in FIG. 12 (step 1220). Distances are counted up from the second of each successive pair of adjacent zero-crossing peaks up until the distance $PG_{max}$, and distances are counted down from each of the first of each successive pair of adjacent zero-crossing peaks up until the distance $PG_{max}$. The resulting Zero Crossing Distance for the 12 peaks from FIG. 11 are shown in FIG. 12. In the case shown in FIG. 12 Peak 2*b* is used as the zero-crossing reference peak for the determination of the zero-crossing distances for peaks 3*b*–6*b* and Peak 11*b* is used to calculate the zero crossing distances for peaks 7*b*–10*b*. Optionally, a subset of the data can be used to save analysis time, for example, by using solely the counting up distances from the $2^{nd}$ adjacent zero-crossing peaks or counting down solely from the first of the adjacent sets of zero-crossing peaks.

The peaks are processed to determine the peaks which represent the measurement data of interest, including imager gap GS, transparent plate optical thickness nt, and pellicle to transparent plate spacing PG (step 1230). This is accomplished by comparing the zero-crossing distance values with the allowable range criteria (defined above) for these values. While this determination is being accomplished, a condition must be maintained wherein a maximum of one peak per interferometer motor scan within the allowable range relative to a given zero-crossing reference peak. For the example shown in FIGS. 12 and 13 we will use the following conditions on the allowable range criteria $900 \leq GS \leq 1075$, $1100 \leq nt \leq 1250$ and $2350 \leq PG \leq 2750$.

Figure 14:
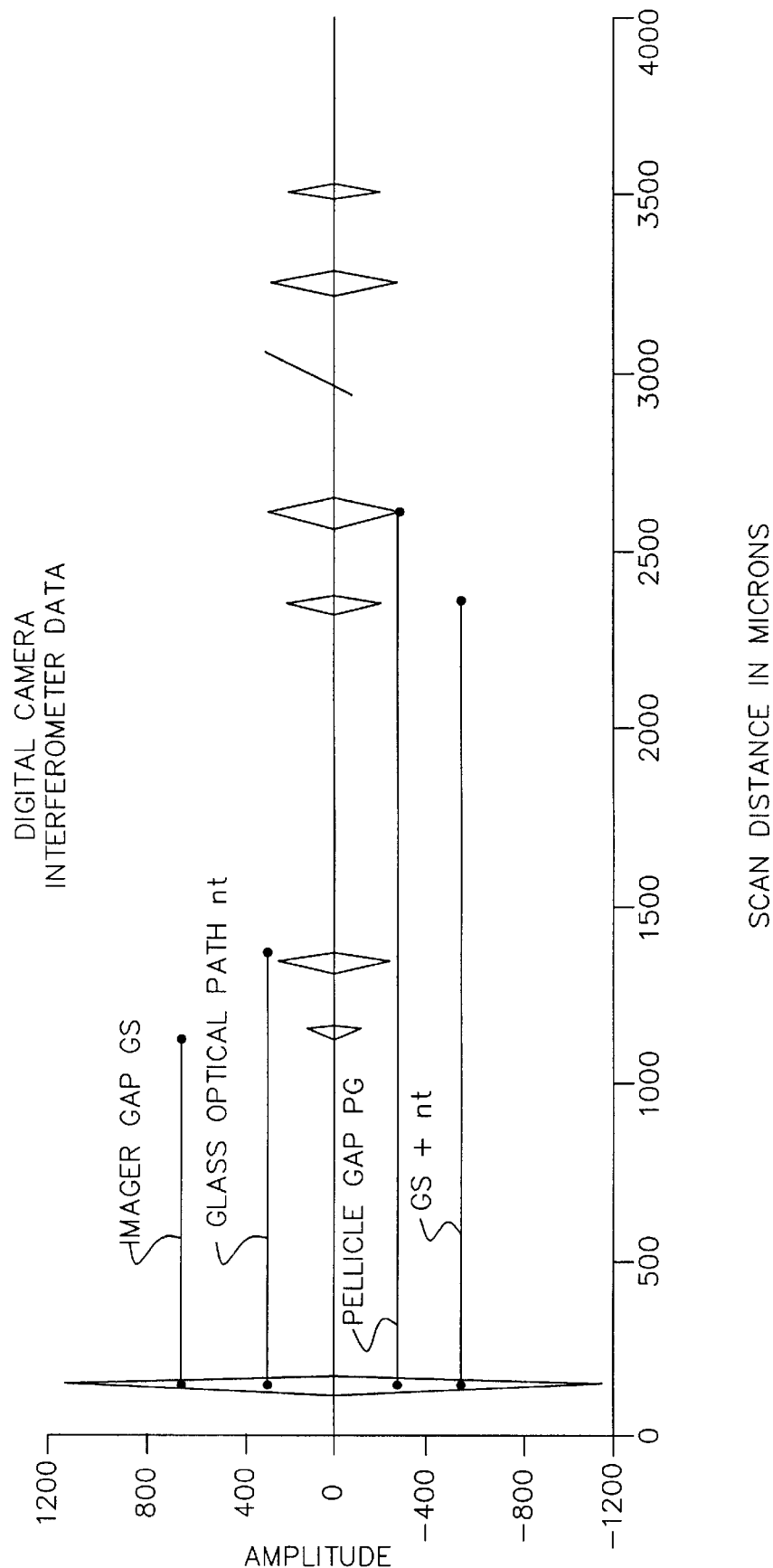
FIG. 14 shows an interferogram of the peaks corresponding to the optical interfaces shown in FIG. 10.

Peaks 3*b* and 10*b* meet the criteria for GS, peaks 4*b* and 9*b* meet the criteria for nt and peaks 6*b* and 7*b* meet the criteria for PG. FIG. 14 shows an interferogram with the peaks GS, nt, PG and GS+nt identified.

Note that the interferogram may include extra peaks, i.e., peaks that do not represent the measurement data of interest. While these extra peaks can occur for various reasons, extra peaks are generally due to multiple reflections or occur at sums and differences of distances between different reflective surfaces interrogated with the optical interferometer. These extra peaks are usually small in amplitude, but may be as large in amplitude as at least one other peak of interest. The occurrence of these extra peaks can cause problems with the analysis of the data. Accordingly, the present invention provides an automated method for determining which peaks are extra peaks and should not be used in calculations of physical parameters related to the object under investigation. The automated method includes adjustable threshold settings and gain adjustment capability to account for possible variations in signal intensity between the various measurement peaks. The threshold setting K is used to select peaks, which have amplitudes greater than a defined lower amplitude level. This lower amplitude level is proportional to the threshold level setting and is also dependent on the detector circuit gain level. As the threshold level is increased, peaks must be greater in amplitude to be selected. When extra peaks are found they usually are of lower amplitude and can be selected out judicial choice of threshold setting. If the threshold setting is set too low then it is possible that noise spikes are interpreted as real peaks.

The peaks are then processed to determine if there is more than one peak representing the imager gap GS, nt or PG within a single interferometer motor scan (step 1240). In this case there would be 2 or more adjacent peaks in the zero crossing distance column of FIG. 12 which meet the same criteria during a single interferometer motor scan. Note that peaks 6b and 7b are not adjacent in this sense, since the interferometer scan direction has shifted and they are referenced to different zero-crossing peaks. If multiple peaks are present within the allowable range for GS, nt, and PG (step 1240), then first a review is made for the presence of 2nt peaks (step 1250). The value of the nt peak is measured and multiplied by 2. Any extra peaks in the PG allowable range which are within a few microns of 2nt are removed from the data set before proceeding to calculating the statistics. If no extra peaks are present then the process continues with step 1270 described below.

An example of the occurrence of extra peaks is shown in FIGS. 1 and 15. FIG. 1 shows the start of a data collection interval for a camera measurement sequence with extra peaks present. FIG. 15 shows the peak locations, amplitudes and nearest zero-crossing distances for the first 9 peaks of FIG. 1. Peak 3a is in the acceptance range for GS, peak 4a is in the acceptance range of nt and peaks 8a and 9a are in the acceptance range of PG. Since peak 8a is equal to 2nt it is eliminated from the PG measured values list. Now the measurement process would proceed to step 1270 in this case.

It is also possible to have extra peaks in the acceptable ranges for the imager gap GS and glass plate optical thickness nt locations. These cases would be handled by raising the threshold setting (step 1260) as described above and in the following example.

Suppose that in the example showing allowable acceptance ranges for GS, and PG were the same as in the example above and the allowable range for nt was expanded to $1100 \leq nt \leq 1350$ and the data in FIGS. 1 and 15 were obtained. In this case we would have 2 peaks (peaks 4a and 5a) with zero-crossing distances 1212.020 and 1307.221 microns respectively meeting the nt criteria. Using the fact that sum and difference peaks should be smaller in amplitude than a single reflection peak we raise the threshold for the nt distance range and recalculate (step 1260). This is equivalent to looking for the highest amplitude peak in the acceptance range in this case. The peak at 1212.020 remains in the data set and the 1307.221 peak is eliminated from consideration.

In some situations all the required peaks may not be present and this condition should be determined (step 1270). For example, either the imager gap peak or the transparent plate nt peak may be below threshold, but the peak which occurs at the sum of these two positions which fits the criteria $(GS)_{min}+(nt)_{min} \leq GS+nt \leq (GS)_{max}+(nt)_{max}$ may be present (step 1280). In the situation wherein the imager gap peak is missing but the other two peaks are present, the imager gap distance can be calculated from the difference in position of the GS+nt peak and the nt peak. In the situation wherein the nt peak is missing but the other two peaks are present, the nt distance can be calculated from the difference in position of the GS+nt peak and the GS peak. When all required peaks are present (i.e., GS, nt and PG) the statistics are calculated (step 1300).

FIGS. 1 and 15 are again used as an example to demonstrate the case in which at least one of the peaks is below threshold. Suppose that the initial threshold setting is 58 counts. Using the acceptance criteria shown in the first example above the GS+nt peak criteria becomes $$2000 \leq GS+nt \leq 2325.$$

With these criteria we will not find a peak in the acceptance range for GS since it is below the threshold limit, but we will find the peaks for nt (peak 4a in FIG. 15) at 1212.020 $\mu$m and GS+nt (peak 7a in FIG. 15) at 2217.051 $\mu$m. GS is then calculated to be 1005.031 from the difference between these two values in excellent agreement with the directly measured value. Thus, when multiple reflections are present known sum of distance peaks can be utilized to determine peak positions.

In the rare case that neither GS nor nt can be calculated from the available data then the threshold is lowered (step 1290) and the peak finding process is repeated starting with step 1190.

Once the statistics for the measurement data of interest, including GS, nt, and PG Are determined (step 1300), the focus error DF is calculated (step 1310). The measured and calculated data for the given probe position is stored into a data file for archiving (step 1320).

The probe position is then checked and a determination is made if the last measurement position was measured (Step 1330). If not the multiplexer position is incremented to the next measurement location (step 1340) and the measurement is repeated starting with step 1130. If the last probe measurement location was measured the measurement is complete (step 1350).

The method described above is generally applicable to the measurement of many multi-optical interface structures. As an example consider a three-layer film system in which the individual layers thickness' fall in 3 distinct thickness ranges. Suppose that the first layer has an optical thickness between 75–100 $\mu$m, the second has a thickness between 110–150 $\mu$m, and the third has a thickness between 500–600 $\mu$m. In this case the same general peak structure would occur as shown in FIG. 13 with the zero-crossing distances having different distances. The first large nonzero-crossing peak would be due to the first layer optical thickness and corresponds to GS. The second major non zero-crossing peak would be due to the second layer optical thickness and corresponds to nt. The third large non zero-crossing peak would be due to the total optical thickness of the first and second layers and correspond to GS+nt, and the fourth large non zero-crossing peak would be due to the third layer optical thickness and corresponds to PG. The measurement sequence and determination of the peaks would closely follow that shown in the flow chart of FIG. 11 with minor modifications being made to the final parameter of interest calculations in step 1310. Instead the parameter of interest may be total thickness.

The method of the present invention was implemented by a computer program written in National Instrument's Lab Windows CVI™ programming environment, and can be commercialized as a computer program on a computer readable storage medium.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

Parts List

1a–12a Interferogram peaks
1b–12b interferogram peaks
12 specify range of peaks step
14 collect and store data step
16 determine location of all peaks step
18 determine which peaks are zero crossings step
20 determine which peaks fit acceptance ranges step
22 identify peaks due to multiple reflections step
24 identify acceptance ranges without peaks step
26 calculate peak locations step
28 calculate sample parameters of interest step
30 locate largest amplitude peaks step
32 multiply largest peaks by amplitude comparison factor step
34 select zero crossing peak step
36 repeat step
38 identify acceptance ranges having more than one peak step
40 identify peaks due to multiple reflections step
42 determine extra peaks due to differences step
44 eliminate extra peaks step
46 specify second acceptance ranges for peaks due to multiples and sums step
48 identify peaks in second acceptance ranges step
50 eliminate peaks of interest step
52 calculate missing peaks step
110 camera body
112 lens
113 photographic film
114 lens mount
115 digital camera body
116 image sensor
118 imager plane
120 transparent cover plate
121 interferometric measurement apparatus
122 gap
123 lock
124 optical probe assembly
125 release
126 fiber optic cable
128 optical coupler
130 non-coherent light source
134 optical fiber
136 non-coherent light interferometer
138 digital processor
140 probe mounting surface
142 optical probe
147 pellicle holder
148 pellicle
152 plate front surface
154 plate back surface
160 optical multiplexer
1100 initiate measurement step
1120 set to first measurement position step
1130 define default settings step
1140 define criteria ranges step
1150 collect data step
1160 determine if 0-crossing value is OK step
1170 raise interferometer gain step
1180 lower interferometer gain step
1190 find interferogram peaks step
1200 generate peak location and amplitude table step
1210 determine zero-crossing peak step
1220 determine distance to nearest zero-crossing peak step
1230 determine peaks of interest step
1240 determine if extra peaks present step
1250 find 2nt peaks step
1260 raise threshold step
1270 check for all required peaks step
1280 check for peak at gs+nt step
1290 lower threshold step
1300 calculate statistics step
1310 calculate focus error step
1320 store probe position data step
1330 determine if last probe position was measured
1340 increment to next measurement location step
1350 completion step

What is claimed is:

1. A method of processing interferometric data relating to a sample having multiple reflective surfaces, comprising the steps of:
    a) specifying a first set of acceptance ranges for peaks of interest in the interferogram, based on a knowledge of the sample;
    b) determining which peaks in the interferogram fall within the acceptance ranges;
    c) identifying which peaks within the acceptance ranges represent multiple reflections and eliminating these peaks from the interferometric data;
    d) identifying acceptance ranges which do not contain peaks; and
    e) employing other peaks in the interferogram to calculate the locations of peaks in the acceptance ranges that do not contain peaks.

2. A computer storage medium having instructions stored therein for causing a computer to perform the method of claim 1.

3. The method claimed in claim 1, wherein the interferometric data is obtained by an interferometer having a detector, further comprising the steps of:
    a) prior to determining which peaks in the interferogram fall within the acceptance ranges, determining which peaks are zero-crossing peaks;
    b) checking to see whether the amplitudes of the zero-crossing peaks are within a predetermined range; and
    c) if the amplitudes of the zero-crossing peaks are above the range, lowering the gain of the detector in the interferometer, and if the amplitude is below the range, raising the gain of the detector.

4. A computer storage medium having instructions stored therein for causing a computer to perform the method of claim 3.

5. The method claimed in claim 1, wherein the step of identifying peaks representing multiple reflections comprises the steps of:
   a) identifying the acceptance ranges having more than one peak;
   b) for acceptance ranges having more than one peak, determining which peaks are a multiple or sum of peak distances from shorter distance peaks and identifying them as peaks representing multiple reflections; and
   c) if the shortest acceptance range has more than one peak, determining which peaks are due to a difference in distance between peaks at larger distances.

6. A computer storage medium having instructions stored therein for causing a computer to perform the method of claim 5.

7. The method claimed in claim 1, wherein the step of employing other peaks to calculate the locations of peaks in the acceptance ranges that do not contain peaks, comprises the steps of:
   a) specifying a second set of acceptance ranges for peaks representing multiples of missing peaks or sums of missing peaks with existing peaks in an acceptance range;
   b) identifying which peaks fall within the second set of acceptance ranges; and
   c) calculating the location of the missing peaks from the locations of the identified peaks.

8. A computer storage medium having instructions stored therein for causing a computer to perform the method of claim 7.

9. The method claimed in claim 7, further comprising the step of eliminating the peaks from the second acceptance ranges having more than one peak which have already been identified as peaks of interest from the first acceptance ranges.

10. A computer storage medium having instructions stored therein for causing a computer to perform the method of claim 9.

11. The method claimed in claim 1, wherein the step of determining which peaks in the interferogram fall within the acceptance ranges, comprises the steps of:
    a) defining a threshold amplitude; and
    b) selecting those peaks in the acceptance ranges which are greater than the threshold amplitude.

12. A computer storage medium having instructions stored therein for causing a computer to perform the method of claim 11.

13. The method claimed in claim 11, further comprising the steps of checking to see if there is at least one peak in each acceptance range and if not, lowering the threshold amplitude until there is at least one peak in every acceptance range.

14. A computer storage medium having instructions stored therein for causing a computer to perform the method of claim 13.

15. The method claimed in claim 1, further comprising the step of determining which peaks are zero crossing and relating the acceptance ranges to the zero crossing peaks.

16. A computer storage medium having instructions stored therein for causing a computer to perform the method of claim 15.

17. A method for processing interferometric data to determine a position of an image sensor relative to a reference surface, the image sensor comprising an imager plane and an optically transparent plate, the imager plane spaced from the optically transparent plate to define a first interstice GS, the optically transparent plate being disposed intermediate the reference surface and the imager plane and being spaced from the optically transparent plate to define a second interstice PG, the method comprising the steps of:

providing a threshold amplitude value K for the interferometric data;

providing a maximum value $GS_{max}$ and a minimum value $GS_{min}$ of the first interstice GS;

providing a maximum value $PG_{max}$ and a minimum value $PG_{min}$ of the second interstice PG;

providing a maximum value $nt_{max}$ and a minimum value $nt_{min}$ of an optical thickness nt of the optically transparent plate;

collecting T seconds of sequential interferometric data;

processing the collected interferometric data to determine a plurality of peak interferometric data having an amplitude greater than the threshold amplitude value K;

processing the plurality of interferometric data to determine a plurality of zero-crossing interferometric data;

processing each of the plurality of peak interferometric data to determine a shortest distance from one of the plurality of the zero-crossing interferometric data;

processing each of the plurality of peak interferometric data to determine GS as being the shortest distance from one of the plurality of the zero-crossing interferometric data which has a value between $GS_{max}$ and $GS_{min}$;

processing each of the plurality of peak interferometric data to determine nt as being the shortest distance from one of the plurality of the zero-crossing interferometric data which has a value between $nt_{max}$ and $nt_{min}$; and processing each of the plurality of peak interferometric data to determine PG as being the shortest distance from one of the plurality of the zero-crossing interferometric data which has a value between $PG_{max}$ and $PG_{min}$.

18. A computer storage medium having instructions stored therein for causing a computer to perform the method of claim 17.

19. The method according to claim 17 wherein the sequential interferometric data is sampled at constant distance intervals.

20. A computer storage medium having instructions stored therein for causing a computer to perform the method of claim 19.

21. The method according to claim 17 wherein the T seconds of sequential interferometric data is collected over a distance of 2S+B wherein S is an interferometer motor scan amplitude and B is a motor amplitude variation buffer.

22. A computer storage medium having instructions stored therein for causing a computer to perform the method of claim 21.

23. The method according to claim 17 wherein the step of processing the plurality of interferometric data to determine a plurality of zero-crossing interferometric data further comprises the steps of;

locating the largest amplitude peak in the first 2S+B distance from the start of the data set determining a largest amplitude of the plurality of zero-crossing interferometric data;

processing the plurality of interferometric data for interferometric data having an amplitude at least 0.60 times the largest amplitude of the plurality of zero-crossing interferometric data; and collecting the interferometric data having an amplitude at least 0.60 times the largest amplitude as zero-crossing interferometric data.

24. A computer storage medium having instructions stored therein for causing a computer to perform the method of claim 23.

25. A method for processing interferometric data to determine a position of an image sensor relative to a reference surface, the image sensor comprising an imager plane and an optically transparent plate, the imager plane spaced from the optically transparent plate to define a first interstice GS, the optically transparent plate being disposed intermediate the reference surface and the imager plane and being spaced from the optically transparent plate to define a second interstice PG, the method comprising the steps of:

providing a threshold amplitude value K of the interferometric data;

providing a maximum value $GS_{max}$ and a minimum value $GS_{min}$ of the first interstice GS;

providing a maximum value $PG_{max}$ and a minimum value $PG_{min}$ of the second interstice PG;

providing a maximum value $nt_{max}$ and a minimum value $nt_{min}$ of an optical thickness nt of the optically transparent plate;

collecting T seconds of sequential interferometric data over a distance of 2S+B wherein S is an interferometer motor scan amplitude and B is a motor amplitude variation buffer;

processing the collected interferometric data to determine a plurality of peak interferometric data having an amplitude greater than the threshold amplitude value K;

processing the plurality of interferometric data to determine a plurality of zero-crossing interferometric data;

processing each of the plurality of peak interferometric data to determine a shortest distance from one of the plurality of the zero-crossing interferometric data, and defining the shortest distance as a zero-crossing distance;

processing each of the plurality of peak interferometric data to determine whether more than one zero-crossing distance has a value between $GS_{max}$ and $GS_{min}$, or a value between $nt_{max}$ and $nt_{min}$, or a value between $PG_{max}$ and $PG_{min}$;

processing each of the plurality of peak interferometric data to determine whether less than one zero-crossing distance has a value between $GS_{max}$ and $GS_{min}$, or a value between $nt_{max}$ and $nt_{min}$, or a value between $PG_{max}$ and $PG_{min}$;

defining GS as being the zero-crossing distance having a value between $GS_{max}$ and $GS_{min}$ when there is solely one zero-crossing distance having a value between $GS_{max}$ and $GS_{min}$;

determining nt as being the zero-crossing distance having a value between $nt_{max}$ and $nt_{min}$ when there is solely one zero-crossing distance having a value between $nt_{max}$ and $nt_{min}$; and determining PG as being the zero-crossing distance having a value between $PG_{max}$ and $PG_{min}$ when there is solely one zero-crossing distance having a value between $PG_{max}$ and $PG_{min}$.

26. A computer storage medium having instructions stored therein for causing a computer to perform the method of claim 25.

* * * * *